April 10, 1928.
B. MAURO
1,666,032
ORGAN
Filed Sept. 9, 1925
3 Sheets-Sheet 2
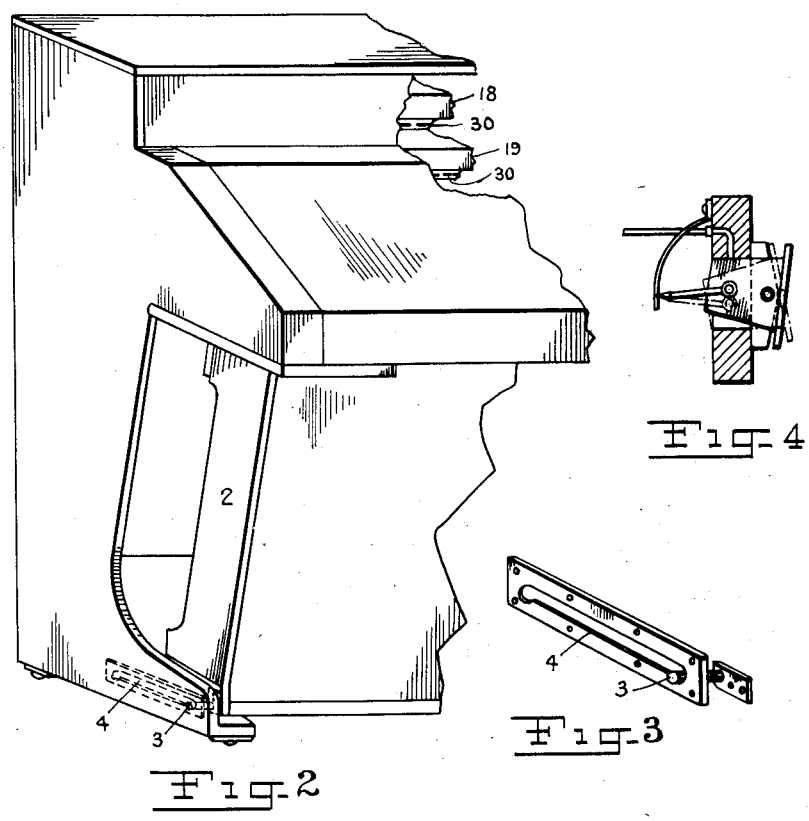
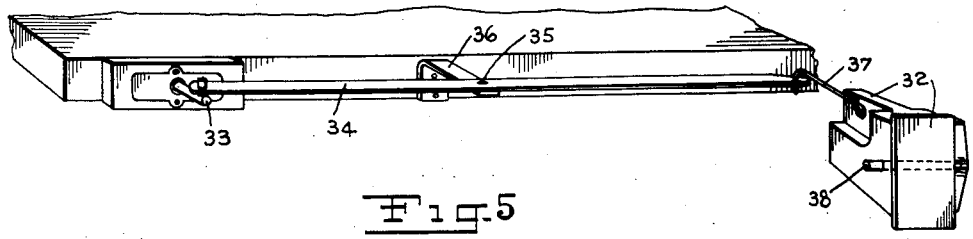

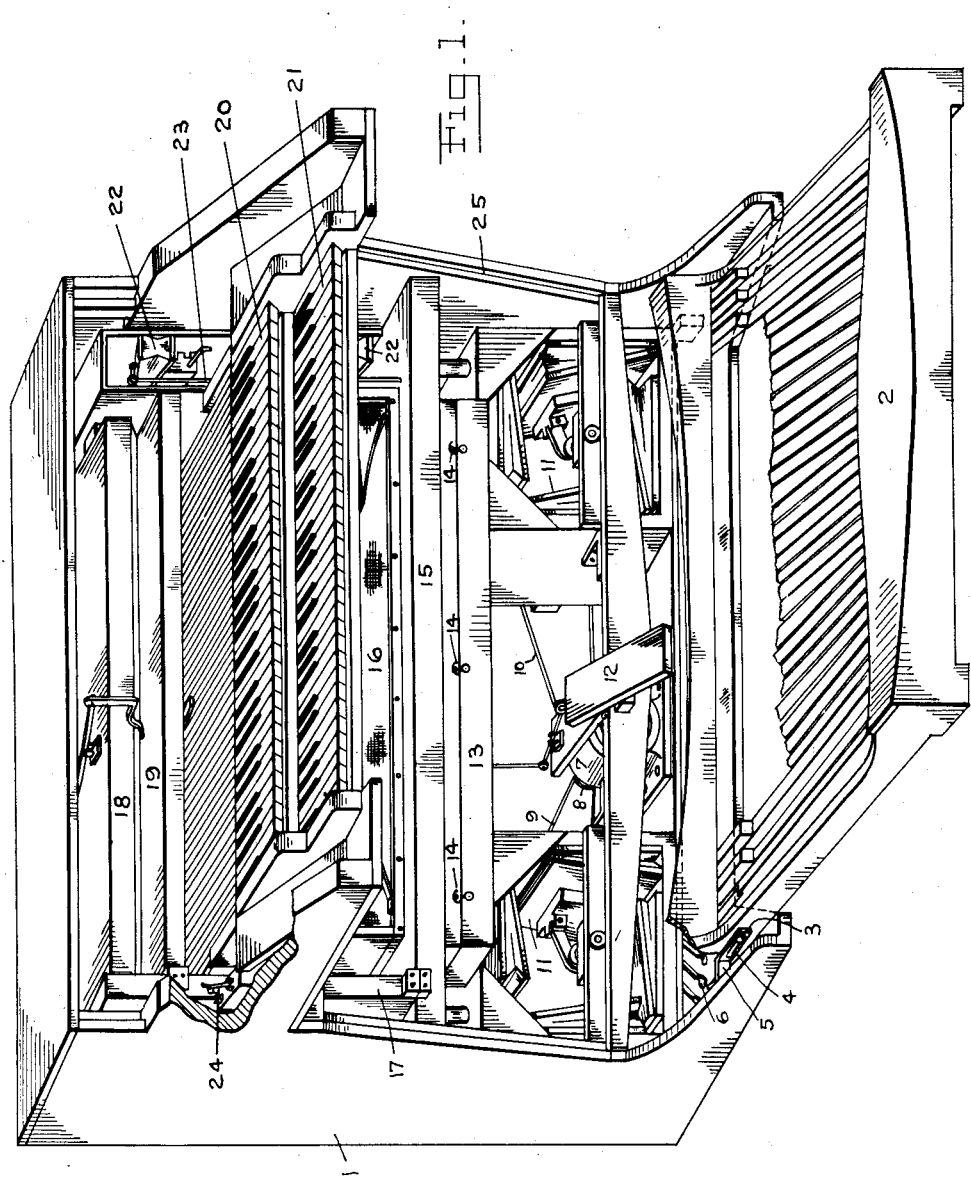

April 10, 1928. 1,666,032
B. MAURO
ORGAN
Filed Sept. 9, 1925 3 Sheets-Sheet 3

Benoit Mauro, Inventor
By his Attorney

Patented Apr. 10, 1928.

1,666,032

UNITED STATES PATENT OFFICE.

BENOIT MAURO, OF BROOKLYN, NEW YORK.

ORGAN.

Application filed September 9, 1925. Serial No. 55,236.

My invention relates to improvements in organs, and more particularly has reference to a compact form of instrument adapted for use in the home, requiring less space than some of the modern types of upright pianos.

Figure 6:
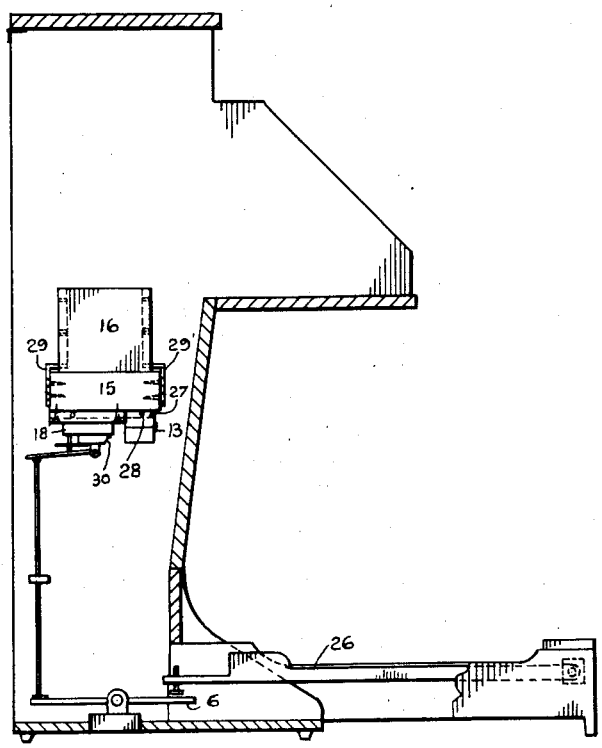
Figure 7:
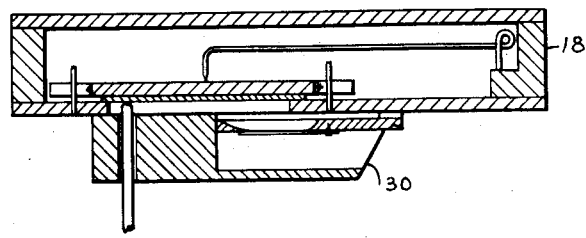

In the accompanying drawings, I have illustrated in Fig. 1 a suitable form of organ in perspective, parts being broken away, the same embodying an application of my invention. Fig. 2 is another perspective view, parts broken away, illustrating the folded position of the pedal board and mounting thereof in dotted outline. Fig. 3 is a detailed perspective view of the pivotal slide mounting of the pedal board. Fig. 4 is a view upon an enlarged scale, partly in cross section, illustrating the tablet or "domino" form of pneumatic control. Fig. 5 illustrates upon an enlarged scale, in perspective, parts being broken away, a suitable form of electric switch for the motor, controlled by a similar tablet or "domino" form of operating mechanism. Fig. 6 illustrates in vertical section, part of the interior of the organ showing the detachable mounting of part of the mechanism thereof and the pedal connections, and Fig. 7 illustrates in cross section, upon an enlarged scale, a detail of the reed mechanism.

1 is the outer frame of the organ, and 2 the foot pedal frame which, it will be observed, is provided with pins 3 at opposite sides, the same adapted to slide in slots 4 in the L-bracket 5 secured within the base of the frame, so that when not in use, the foot pedal board can be pulled out in the position shown and then lifted vertically beneath the keyboard of the organ out of the way as shown in Fig. 2. When lowered in position for playing, as shown in Fig. 1, it is pushed inwardly so that the foot pedal rods 26 extend above the levers 6, for operating the same.

7 indicates an electric motor having a pulley 8 upon which is mounted the straps 9, 10, for operating the pumps 11 at opposite sides in the bottom of the case, and 12 is the swell crescendo pedal. 13 is the shutter cover of the pedal chest which may be opened by operating the hooks 14, thus conveniently exposing the same for inspection, repair, etc. 15 indicates the wind channel, and 16 the detachable bellows upon which the wind channel 15 is mounted. 27 indicates wooden brackets secured upon the inside of each side of the organ frame by screws or other suitable means 28. These serve to support the wind channel 15 which is also provided with brackets 29, 29', retaining the detachable bellows 16 thereon, so that by removing the brackets 29, the detachable bellows 16 may be removed and the wind channel 15 may also slide out through the back of the organ frame from the brackets 27. 17 is a side wind channel, and 18, 19 the reed chests in the top of the case the reeds thereof being indicated by the reference character 30. 20, 21, are the two decks of keys common to a two manual organ, and 22 indicates a pneumatic connected to the rod 23, which in turn is controlled by the stop. 24 indicates an electric switch for controlling the motor 7 and this is preferably operated through the medium of a rod 34 connected to a stop 32 in the front of the casing above the keys. The switch is preferably of the well known push button variety, the button thereof being represented by the spindle 33, which is pivotally connected to a bar 34, pivotally mounted at 35, upon the bracket 36, and pivotally connected at the opposite end to the link or hook 37, which in turn is pivotally mounted upon the stop 32, as shown, said stop being pivotally mounted on the pin 38, so that when the front or tablet of the stop 32 is pulled out at the top, it pushes the button 33 of the switch in, and when pushed in at the top or pulled out at the bottom, it pulls the button 33 out, thus cutting in or out the current to the motor. This front casing is entirely removable for giving convenient access to the interior parts, and the same applies to a panel board adapted to fit into the frame at 25, which is removable for access to the interior of the organ beneath the keyboard.

This arrangement of the parts facilitates convenient access to all parts of the organ almost instantly, and thus very materially reduces the time required for cleaning and making repairs, while at the same time it cheapens the construction of the instrument without impairing the quality of the same.

Of course it will be understood that various modifications may be made in the construction and arrangement of parts without departing from the spirit of the invention as claimed.

I claim:—

1. In an organ of the class described, pumping mechanism in the base thereof, a pedal chest above said pumping mechanism, a wind channel above said pedal chest, and detachable bellows above said wind channel, keyboards above said bellows, and reed chests above said keyboards, said reed chests connected to said wind channel by a channel at one side of said instrument.

2. In an organ of the class described, pumping mechanism in the base thereof, a pedal chest above said pumping mechanism, a wind channel above said pedal chest, and detachable bellows above said wind channel, keyboards above said bellows, and reed chests above said keyboards, said reed chests connected to said wind channel by a channel at one side of said instrument, and a pneumatic at the other side of said instrument.

3. In an organ of the class described, pumping mechanism in the base thereof, a pedal chest above said pumping mechanism, a wind channel above said pedal chest, and detachable bellows above said wind channel, keyboards above said bellows, and reed chests above said keyboards, said reed chests connected to said wind channel by a channel at one side of said instrument, and a pneumatic at the other side of said instrument, all of said parts at the back of said keyboards.

4. In an organ of the class described, pumping mechanism in the base thereof, a pedal chest above said pumping mechanism, a wind channel above said pedal chest, and detachable bellows above said wind channel, keyboards above said bellows, and reed chests above said keyboards, said reed chests connected to said wind channel by a channel at one side of said instrument, and a pneumatic at the other side of said instrument, all of said parts at the back of said keyboards, an electric motor for driving said pumping mechanism, and a switch therefor adapted to be operated at the front of said organ.

In testimony whereof I hereunto affix my signature.

BENOIT MAURO.